No. 755,298.

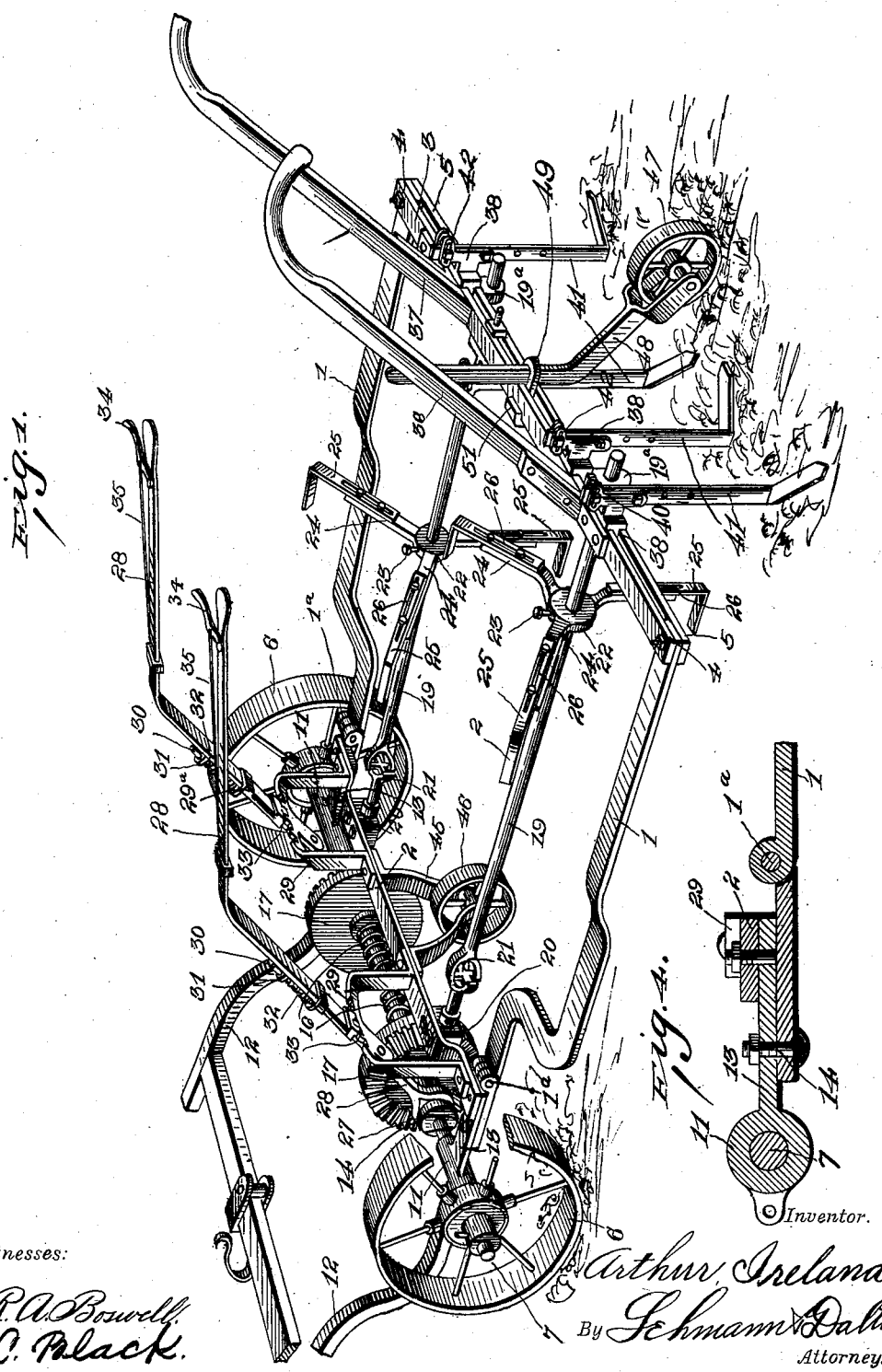

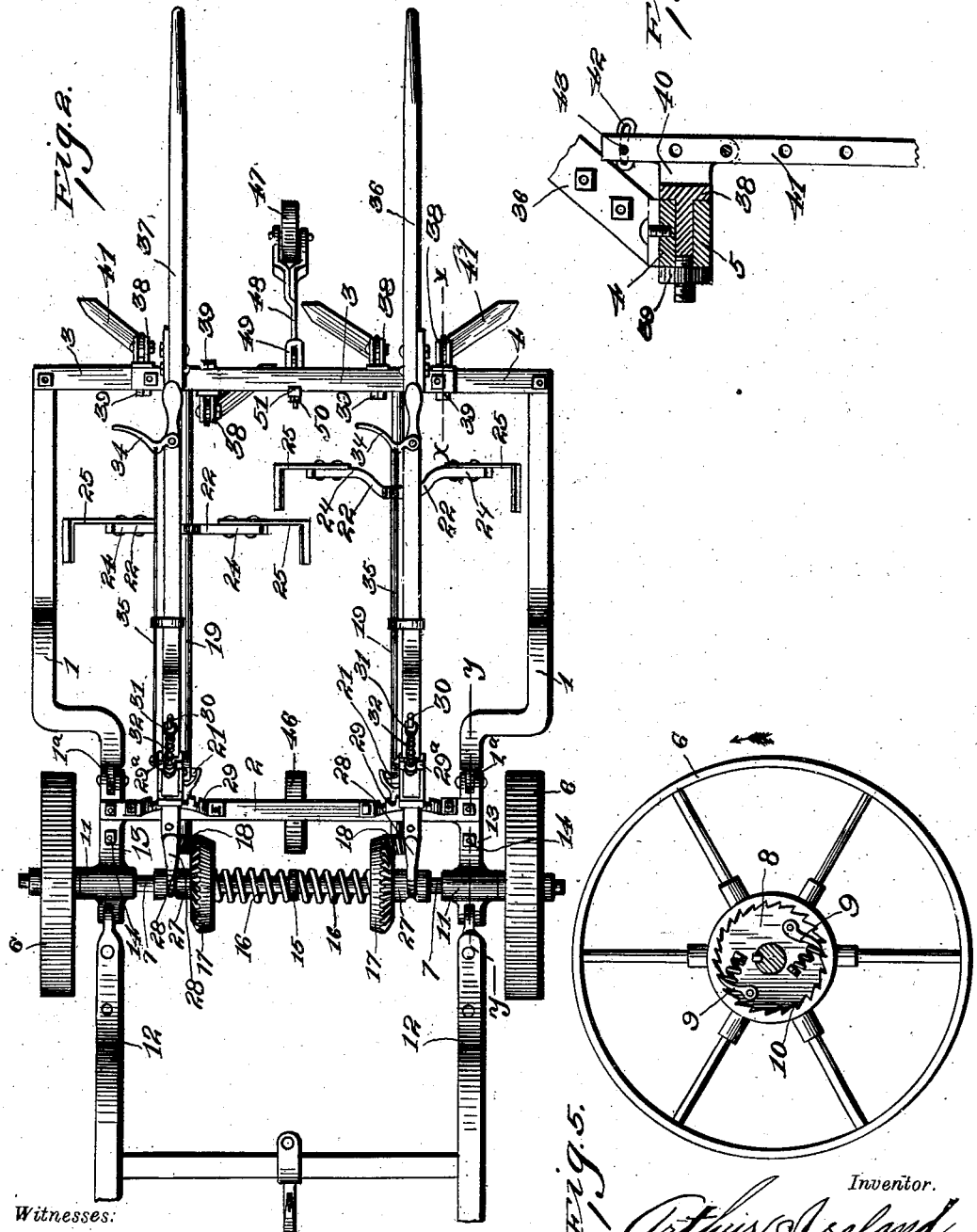

Patented March 22, 1904.

UNITED STATES PATENT OFFICE.

ARTHUR IRELAND, OF ROY, UTAH.

COMBINED BEET THINNING AND CULTIVATING MACHINE.

SPECIFICATION forming part of Letters Patent No. 755,298, dated March 22, 1904.

Application filed June 18, 1902. Serial No. 112,240. (No model.)

*To all whom it may concern:*

Be it known that I, ARTHUR IRELAND, a citizen of the United States, residing at Roy, in the county of Weber and State of Utah, have invented certain new and useful Improvements in a Combined Beet Thinning and Cultivating Machine; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in combined choppers and cultivators adapted for use in thinning or for chopping the tops of beets in a field simultaneous with the cultivation or weeding of the beet-field; and its object is to provide a machine of simple and inexpensive construction.

Another object of the invention is to provide a means whereby the frame of the machine may be conveniently moved up and down or from side to side to accommodate the machine to the irregularities of the rows without stopping or disturbing its operation.

A further object is to provide means for adjusting the cultivating or weeding knives to arrange them in the proper position with relation to the rotary cutters, so as to cut all the weeds from between the rows irrespective of the width of the latter.

Another object is to provide means to permit the plowman to conveniently disengage one or both of the rotary choppers from the driving-axle; and, lastly, it has for its object to combine and aggroup the parts in a novel manner and render the operation of the machine more efficient.

For a further understanding of the merits and advantages of the invention reference is to be had to the following description and the accompanying drawings, in which—

Figure 1 is a perspective view of the machine constructed in accordance with my invention. Fig. 2 is a top plan view. Fig. 3 is a cross-section on the line $xx$ of Fig. 2. Fig. 4 is a cross-section on the line $yy$ of Fig. 2; and Fig. 5 is a view in elevation of one of the traction-wheels, showing the clutch in its hub.

Like characters of reference indicate corresponding parts in the several views.

The frame of the machine is preferably constructed of flat metal bars and comprises two side pieces 1, a front piece 2, and a rear end piece 3, formed of two parallel bars 4 and 5.

The traction-wheels 6 are loosely mounted on an axle 7, and in the hub of each wheel is mounted a ratchet consisting of a disk 8, keyed to the axle 7 and having spring-pressed pawls 9 to engage the teeth 10 in the inner periphery of the hub when the machine is being drawn forward. When, however, the machine is pulled back, the axle 7 and the chopping-knives are not rotated, as the pawls will slide past the ratchets.

Loosely hung upon the axle 7 are bearings 11, to which the thills 12 are connected. One side of the bearings is provided with arms 13, to which the side pieces 1 are pivoted by means of a bolt 14 and which permits lateral movement of the frame. The ends of these arms are riveted to the front cross-piece 2, so that the said cross-piece is held from movement, and the side pieces 1 are hinged at 1ª to permit the frame to be raised and lowered.

On the axle 7 is a collar 15 and two coil-springs 16, which normally hold the beveled gears 17 in engagement with the bevel-gears 18 on the rotary chopper-shafts 19. The chopper-shafts 19 are journaled in suitable bearings 20, depending from the front piece 2 of the frame and are provided with universal joints 21, which prevent any interruption of their operation when the frame is raised or lowered or moved laterally. On the shafts 19 are longitudinally-adjustable choppers 22, held in the desired position by binding-screws 23 and having arms 24, on which are mounted blades 25, provided with longitudinal slots 26 to permit of their adjustment. The ends of the blades are bent forward at right angles to sever the tops of the beets. I prefer to provide a rearward bend in the arms 24 of one of the choppers, so that when they are adjusted parallel on the shafts they will be prevented from contacting with each other. The ends of the shafts 19 are journaled in suitable bearings 19ª, depending from the bar 5.

The beveled gears 17 are splined upon the axle 7 and capable of longitudinal movement thereon, and each is provided with a boss 27, which is engaged by the end of a lever 28, pivoted to an upright rack-bar 29, secured to the front piece 2 of the frame, the said lever extending upwardly and rearwardly into convenient reach of the plowman.

On the lever 28 is mounted a sleeve 29ª, having a pin 30, which passes through an eye 31, and on this pin below the eye 31 is a coil-spring 32, which presses the sleeve down and holds the dog 33 in engagement with one of the notches in the rack-bar to hold the lever from movement and the gear 17 disengaged from the gear 18. When it is desired to withdraw the dog 33 from the notches in the rack-bar and throw the gears 17 and 18 out of engagement, the handle 34, which is pivoted to the end of the lever 28, is pulled, and a rod 35, which is attached at one end to the handle 34 and at its other end to the sleeve 29, is also pulled to draw the sleeve upwardly against the tension of the spring 32.

To the top of the rear bar 4 is secured a pair of handles 36 and 37, by which the operator guides and operates the machine.

Mounted in the slot formed by the two bars 4 and 5 are adjustable standards 38, bound at the desired place by nuts 39, which engage the edges of the bars 4 and 5. (See Fig. 3.) These standards are provided at one end with bifurcated arms 40, to the lower ends of which are pivoted the weeding-knives 41, and the upper ends are provided with transverse curved slots 42. In the top of the knife is a pin 43, projecting from each side thereof and traversing the slot 42 in the arms 40. By this construction the knives may be tilted and held in such tilted positon by a binding-nut on the end of the pin 43, and thus the knives are caused to enter the soil at the proper angle. When the rows are narrow, the standards may be moved farther apart along the bars 4 and 5, as desired, and instead of the weeding-knives shown cultivator-teeth might be employed, in which case the uprights of the teeth would be held between the arms 40.

Depending from the front bar 2 are standards 45, in which is journaled a central wheel 46, which engages the ground between the rows.

On the rear end of the frame is mounted a central guide-wheel 47, having a standard 48, which is engaged by a clamp 49, provided with a slot through which the standard passes. This clamp is fitted in the slot between the bars 4 and 5, and its end is provided with a nut 50 to engage a plate 51, through which the screw-threaded end of the clamp passes and binds the standard 48 in the slot and against the edge of the bars 4 and 5.

By the above-described construction and arrangement of parts it will be seen that the operator is in a convenient position to throw the machine from side to side to accommodate it to the irregularities of the rows, and this is effected by means of the pivotal connection of the side piece 1 with the arm 13. Ready access is gained to the levers 28 to disengage the gears 17 from the gears 18, as the said levers extend rearwardly within reach of the plowman. The vertical adjustment of the frame is effected by means of the hinge 1ª in the bars 1 and held in such elevation by the wheel 47.

Having thus described my invention, what I claim, and desire to secure by Letters Patent, is—

1. In a machine of the class described, an axle, bearings at opposite ends of the axle and having arms projecting therefrom, a transverse front bar rigidly connecting the arms, longitudinal bars horizontally pivoted at their front ends to the respective arms and provided with vertical hinges near their front ends independent of their respective horizontal pivots, transverse parallel rear bars connecting the rear ends of the longitudinal bars, teeth carried by the transvere rear bars, and a supporting-wheel adjustably connected to the transverse rear bars.

2. In a machine of the class described, an axle, a rectangular frame having a vertical and horizontal hinged connection with the axle, standards adjustable transversely on the rear bar of the frame, weeding-knives pivoted to the standards and adapted to be adjusted angularly with relation to the surface of the ground, means to hold them in such adjusted positions, a supporting-wheel clamped to the rear bar of the frame and adapted to be adjusted transversely thereon, and means to hold the frame at different elevations.

In testimony whereof I affix my signature in presence of two witnesses.

ARTHUR IRELAND.

Witnesses:
JOHN F. CORKER,
NELLIE MULHALL.